July 20, 1937.    P. S. HOUGHTON    2,087,646
ANIMAL TRAP
Filed Nov. 19, 1935

INVENTOR
Percy S. Houghton
By Ralph Burch
Attorney

Patented July 20, 1937

2,087,646

UNITED STATES PATENT OFFICE 2,087,646

ANIMAL TRAP

Percy Stevens Houghton, Sheerness, Alberta, Canada

Application November 19, 1935, Serial No. 50,602
In Canada July 26, 1935

2 Claims. (Cl. 43—61)

This invention relates to improvements in a collapsible animal trap. Its primary object being to provide a humane animal trap that may be collapsed when not in use for storage or shipping purposes.

A further object of the invention is to devise and construct a collapsible animal trap that will in no way harm the animals caught therein so that the furs, skins, etc., will not be damaged or that the animals may be used for breeding purposes in the establishment of commercial fur farms, etc.

With these and other objects in view that may appear while the description proceeds, the invention consists in the novel construction and arrangement of parts as hereinafter more specifically set forth, claimed and shown in the accompanying drawing forming part of this application and in which:—

Figure 1:
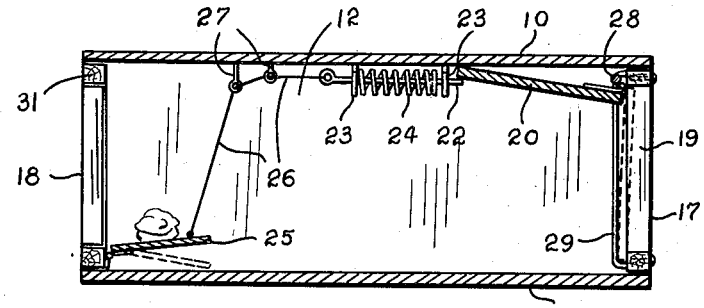
Fig. 1 is a longitudinal sectional elevation through my improved collapsible animal trap.
Figure 2:
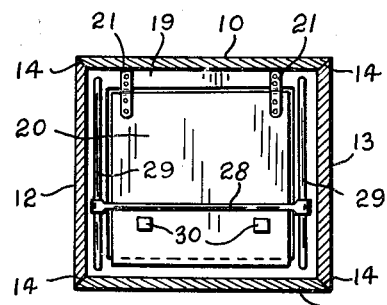
Fig. 2 is a transverse cross-sectional elevation looking toward the entrance.
Figure 3:
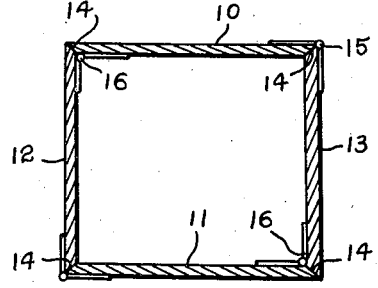
Fig. 3 is a transverse cross-sectional elevation showing the manner of attaching the hinges.

Referring more in detail to the drawing in which similar reference characters designate corresponding parts throughout the several views it will be seen the invention comprises a collapsible box including top 10, bottom 11, and sides 12 and 13. The adjacent corners 14 of each of the foregoing are mitered at an angle of 45° as shown to facilitate folding and are hinged together by a plurality of outside hinges 15 and inside hinges 16 arranged on oppositely disposed corners. The ends constitute an entrance 17 and an exit 18. The former comprises a square frame 19 hinged on one of the side members having a vertically hinged door 20 attached thereto. The hinges 21 being at the top so that the door is actuated by gravity when the retaining means are released. The said door is held open by means of a rod 22 supported by the guides 23 in the top 10 and actuated by a spring 24, the tension of which is arranged to hold the bolt toward the door and in engagement with the same when open and the trap set as shown in Fig. 1. A hinged treadle 25 is positioned near the opposite end of the box and the bait placed thereon. Connected to the said treadle and to the rod 22 are pull cords 26 in guides 27 in a manner to withdraw the said rod and release the door 20 when the treadle is depressed. A transverse rod 28 is slidably mounted on guide rods 29 behind the said door and is held in a raised position by the door when the same is open. When the trap is sprung and the door closed the rod 28 slides down on the guide rods and rests on the stops 30 on the back of the door in a manner to prevent opening of the same.

The exit end of the trap comprises a hinged door frame 31 having a wire screen 32 fixed thereto to admit light to the interior. Said door is hung on suitable hinges 33 and a fastener 34 is provided therefor. The treadle 25 is hingedly connected to the lower rail of the door frame 31 and is adapted to fold against the door when the trap is collapsed.

Figure 4:
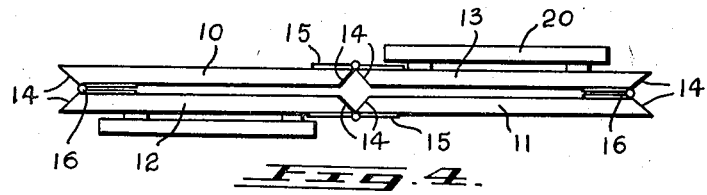
Fig. 4 is an end view of the trap when collapsed.
Figure 5:
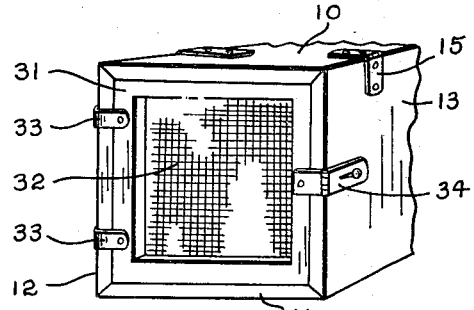
Fig. 5 is a perspective view of the closed exit.

In order to fold up or collapse the trap the entrance frame 17 and exit 18 are first swung out of place on their hinges, then the remaining structure will collapse into the position shown in Fig. 4.

From the foregoing it will be seen that I have devised a humane collapsible animal trap that is inexpensive to build and simple to set up and operate and one in which the animal caught therein may be taken out through the exit unharmed.

It is believed that the construction and advantages of the structure may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:—

1. In an animal trap of the character described comprising a rectangular structure, a trap door hingedly mounted at one end of said structure, a trigger rod slidably secured to the top of said structure for engaging and holding said trap door in an open position, a treadle hingedly mounted at the opposite end of said structure, a pull cord connecting said treadle with said trigger rod and a spring mounted on said trigger rod normally holding the trigger rod in engaging relation to said door and said treadle in a raised or set position.

2. In a collapsible animal trap as described comprising a rectangular structure open at both ends and having its sides hinged together to permit folding of the sides, a front and rear door frame hingedly mounted in the ends of said structure and adapted to swing outwardly, a trap door hingedly connected to the front door frame, a trigger for engaging and holding said door in an open position, spring means normally holding said trigger in engaging position, a treadle hingedly connected to said rear door frame and means connecting said treadle with said trigger whereby said treadle is normally held in a set position, said treadle being operable to release said trigger.

PERCY STEVENS HOUGHTON.